United States Patent [19]

Takeuchi et al.

[11] Patent Number: 4,516,993
[45] Date of Patent: May 14, 1985

[54] CARBON PARTICULATES CLEANING DEVICE

[75] Inventors: Yukihisa Takeuchi, Chita; Masahiro Tomita, Anjo, both of Japan

[73] Assignees: Nippondenso Co., Ltd., Kariya; Nippon Soken, Inc., Nishio, both of Japan

[21] Appl. No.: 499,404

[22] Filed: May 31, 1983

[30] Foreign Application Priority Data

Jun. 1, 1982 [JP] Japan .................................. 57-93325

[51] Int. Cl.³ ............................................ B01D 46/42
[52] U.S. Cl. ........................................ 55/283; 55/466; 55/DIG. 10; 55/DIG. 30; 422/178; 60/303; 60/311
[58] Field of Search ................. 55/208, 282, 283, 466, 55/523, DIG. 10, DIG. 30; 422/174, 178, 199; 60/295, 299, 300, 303, 311; 338/262

[56] References Cited

U.S. PATENT DOCUMENTS

| 4,105,530 | 8/1978 | Johnson et al. | 338/262 |
| 4,276,066 | 6/1981 | Bly et al. | 55/287 |
| 4,373,330 | 2/1983 | Stark | 60/295 |
| 4,427,418 | 1/1984 | Kogiso et al. | 60/300 |

FOREIGN PATENT DOCUMENTS

| 203813 | 12/1982 | Japan | 60/311 |
| 203812 | 12/1982 | Japan | 60/311 |
| 195814 | 12/1982 | Japan | 60/311 |

Primary Examiner—David L. Lacey
Attorney, Agent, or Firm—Cushman, Darby & Cushman

[57] ABSTRACT

A carbon particulates cleaning device for collecting carbon particulates in exhaust gases discharged from an internal combustion engine and burning off the collected carbon particulates, is disclosed. The carbon particulates cleaning device comprises a heat resistant filter member, an electric heater which is provided on the upstream end surface of the filter member for regenerating the filter member, and an electric power source for supplying electric current to the electric heater. The electric heater is composed of at least two kinds of heating resistors, each of which applies different electric power to a unit area of the upstream end surface of the filter member. At the filter member regenerating time, electric current is supplied to the heating resistors successively in the order of from one providing the maximum electric power density to one providing the minimum electric power density.

11 Claims, 7 Drawing Figures

CARBON PARTICULATES CLEANING DEVICE

BACKGROUND OF THE INVENTION

The present invention relates to a carbon particulates cleaning device for collecting carbon particulates in exhaust gases discharged from an internal combustion engine and burning off the collected carbon particulates.

Recently, the diesel engine has been employed as an engine for a vehicle because of low fuel cost. However, the diesel engine discharges a larger amount of carbon particulates (smoke) as compared with the gasoline engine. Therefore, a particulates cleaning device for reducing the amount of discharged smoke is required.

Conventionally, such a particulates cleaning device has been composed of a heat resistant filter member which is formed of porous ceramic or metal fiber and is disposed in an exhaust gas passage of the diesel engine and an electric heater for heating and igniting carbon particulates collected by the filter member, which is disposed on or near the upstream end surface of the filter member. By this conventional device, carbon particulates collected in the upstream end portion of the filter member are ignited by the electric heater and the combustion flame is transmitted to the downstream portion of the filter member. As a result, all of the carbon particulates collected by the filter member are burnt off so that the filter member is regenerated.

However, the carbon particulates cleaning device of this type has a problem that the temperature of the exhaust gases is lower than the igniting temperature of carbon particulates while the vehicle runs under normal condition so that heat generated by the electric heater is taken away by the flowing exhaust gses when the volume of flowing exhaust gases is large, consequently, ignitability of carbon particulates is reduced.

In order to overcome this problem, such measures as to flow exhaust gases into a by-pass passage at the filter member regenerating time or to provide two filter members in parallel, which alternately collect carbon particulates while the inactive filter member is regenerated, have been taken.

However, in the former case, uncleaned exhaust gases are discharged from the by-pass passage at the filter member regenerating time and in the latter case, production cost and weight of the device increase.

In addition, in both cases, a diverter valve for changing the exhaust gas flow must be provided so that the structure of the device becomes complex.

Accordingly, one object of the present invention is to provide a carbon particulates cleaning device by which the carbon particulates collected by the filter member are surely ignited by consuming only a small amount of electric power and all of the collected particulates are burnt off without providing the above described by-pass passage or providing two filter members in parallel.

SUMMARY OF THE INVENTION

The carbon particulates cleaning device of the present invention comprises a heat resistant filter member, an electric heater which is provided on the upstream end surface of the filter member for regenerating the filter member, and an electric current supplying means for supplying electric current to the electric heater.

The electric heater is composed of at least two kinds of heating resistors, which are constructed so as to provide the different electric power to a unit area of the upstream end surface of the filter member. The heating resistors are made of nichrome alloy, platinum, molybdenum-manganese alloy, tungsten, gold, silver-paradium alloy, titanium nitride, titanium carbide, silicon carbide or molybdenum silicate. Hereinafter, electric power to be applied to a unit area of the upstream end surface of the filter member will be called "electric power density".

These heating resistors are disposed on the whole end surface of the filter member so as to be distributed almost uniformly.

The electric current supplying means is constructed so that electric current is supplied to the heating resistors successively in the order of from one providing the maximum electric power density to one providing the minimum electric power density at predetermined time intervals, at the filter member regenerating time.

According to the present invention, at first the carbon particulates collected near the upstream end portion of the filter member, which is in contact with the heating resistor having the maximum electric power density are ignited and the combustion flame is transmitted to the downstream side of the above upstream end portion so that the filter portion positioned on the downstream side of the above resistor is regenerated.

Therefore, exhaust gases concentrically flow into the regenerated filter portion so that the volume of exhaust gases flowing into the other filter portion decreases.

Next, electric current is supplied to another heating resistor. Since the volume of exhaust gases flowing into the filter portion which is positioned on the downstream of another heating resistor is small, another heating resistor is not cooled by the flowing exhaust gases so much so that the carbon particulates collected near another heating resistor are easily ignited and the carbon particulates collected in the filter portion on the downstream side of another heating resistor are burnt off. This regeneration of the filter portion continues until the filter portion on the downstream side of the heating resistor having the minimum electric power density is regenerated. As a result, all of the carbon particulates collected in all portions of the filter member can be burnt off and the filter member can be entirely regenerated.

DETAILED DESCRIPTION OF EMBODIMENTS

Hereinafter, the present invention will be explained in accordance with the embodiments thereof with reference to the drawings.

Figure 1:
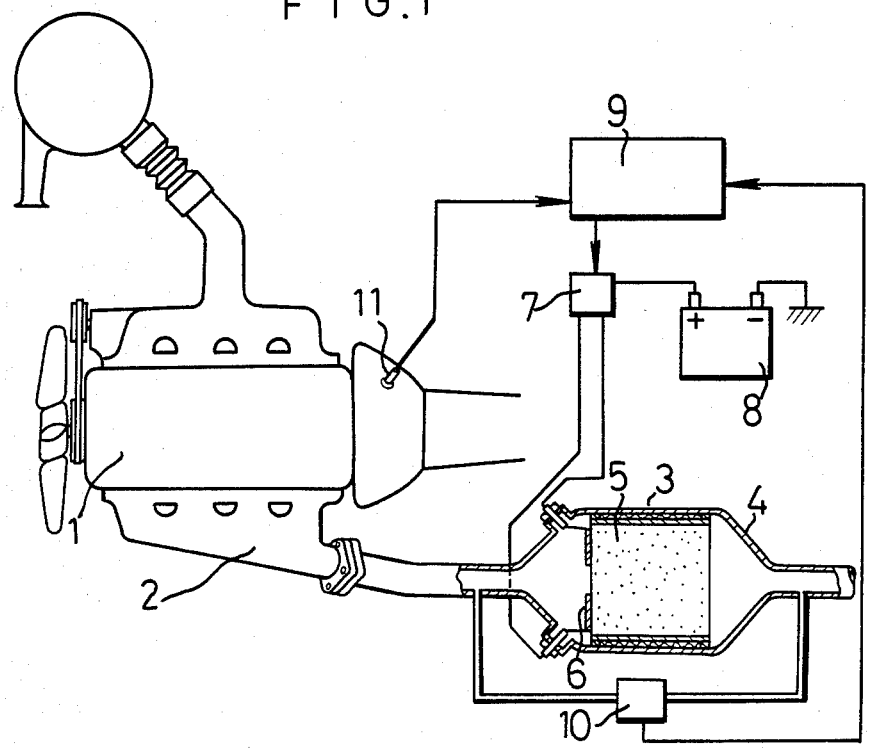
FIG. 1 is a view illustrating an exhaust system of an internal combustion engine provided with an exhaust gas cleaning device according to the present invention.

In FIG. 1, the reference numeral 1 designates an internal combustion engine, 2 designates an exhaust pipe, and 3 designates a carbon particulates cleaning device provided with an electric heater, according to the present invention. The carbon particulates cleaning device 3 comprises a casing 4, a filter member 5 accomodated within the casing 4, and an electric heater 6 provided on the upstream end surface of the filter member 5. The filter member 5 is composed of a foamed body or a honeycomb structure, which is provided with a large number of open holes, and is made of heat resistant ceramic such as cordierite or alumina.

A differential pressure sensor 10 is mounted on the casing 4 for detecting the differential pressure between the upstream side and the downstream side of the filter member 5. The sensor 10 is electrically connected to a relay 7 through a control device 9. The electric heater 6 is electrically connected to a battery 8 through the relay 7.

In operation, when exhaust gases containing carbon particulates pass through the filter member 5, the carbon particulates are collected by the filter member 5. As the amount of collected particulates increases, the flowing resistance of the filter member 5 gradually increases so that the differential pressure between the upstream side and the downsteam side of the filter member 5 increases.

When the differential pressure reaches a predetermined value, the differential pressure sensor 10 supplies electric signal to the control device 9. The control device 9 supplies electric signal to the relay 7 so that electric current is supplied to the heater 6 from the battery 8 through the relay 7. Then, the electric heater 6 generates heat to ignite the particulates collected near the upstream end surface of the filter member 5. The combustion heat of carbon particulates is transmitted to the downstream portion of the filter member 5 so that all of the collected carbon particulates are burnt off.

The differential pressure varies in accordance with the engine speed. By connecting an engine speed sensor 11 to the control device 9, electric signal which is not influenced by the engine speed can be supplied to the relay 7 so that the electric heater 6 can be accurately operated in accordance with only the collecting degree of carbon particulates.

Figure 2:
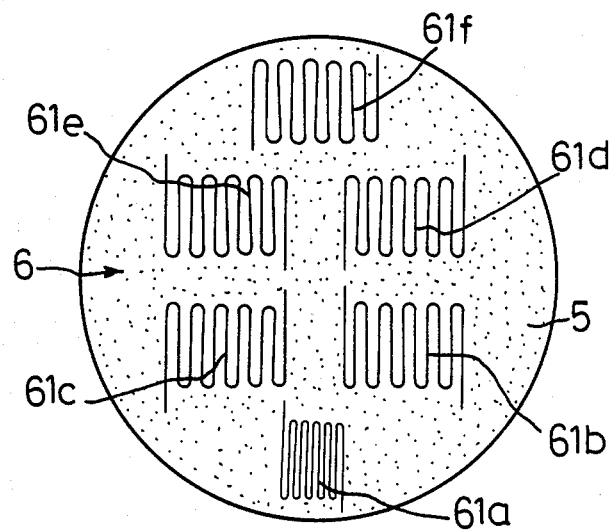
FIGS. 2 to 7 are views mainly illustrating electric heaters employed in a first to a sixth embodiments of the carbon particulates cleaning device according to the present invention.

FIG. 2 illustrates a first embodiment of a carbon particulates cleaning device according to the present invention.

The electric heater 6 is provided on the upstream end surface of the filter member 5 and is composed of six heating resistors 61a, 61b, 61c, 61d, 61e, 61f, each of which is formed of a nichrome wire. These heating resistors are distributed on the whole upstream end surface almost uniformly and are adhered thereto by an inorganic adhesive.

The nichrome wires of these heating resistors 61a to 61f have the same diameter and the same length as one another and are formed into a wave shape, respectively.

The heating resistors 61b to 61f have the same shape as one another. Only the heating resistor 61a is formed small as compared with the other heating resistors. Namely, the distance between adjacent waves of the heating resistor 61a is made smaller than that of the other heating resistors while the height of the waves of the heating resistor 61a is equal to that of the other heating resistors.

Therefore, the contacting area of the heating resistor 61a with the filter member is smaller than that of the other heating resistors 61b to 61f so that the electric power density of the heating resistor 61a is larger than that of the other heating resistors 61b to 61f.

These heating resistors 61a to 61f are connected to the battery 8 through the relay 7 in parallel as shown in FIG. 1.

The relay 7 is provided with six contact points (not shown). One end of each contact point is connected to the battery 8 while the other end thereof is connected to each of the heating resistors.

These contact points are successively turned on for a predetermined time in order upon receiving electric signal from the control device 9.

The heating resistor 61a is connected to the contact point which is first turned on. And the other heating resistors 61b to 61f are connected to the other contact points in order.

In operation, when the exhaust gases discharged from an engine 1 (FIG. 1) pass through the filter member 5, carbon particulates are collected by the filter member 5. As the collecting degree of carbon particultes increases, the differential pressure between the upstream side and the downstream side of the filter member 5 increases.

When the differential pressure reaches a predetermined level, the differential pressure sensor 10 supplies electric signal to the control device 9. The control device 9 supplies electric signal to the relay 7. As a result, the contact point connected to the heating resistor 61a is firstly turned on so that the heating resistor 61a generates heat.

The heating resistor 61a applies a large amount of electric power to the contact surface of the filter member 5. Therefore, even when the temperature of exhaust gases is low and the the flowing volume thereof is large, the carbon particulates collected near the upstream end surface of the filter member 5 can be easily ignited. The combustion flame is carried by the exhaust gas flow to the downstream side of the heating resistor 61a. As a result, in the filter member on the downstream side of the heating resistor 61a, a nearly truncated cone-shaped regenerated portion of which the diameter increases toward the downstream end thereof, is formed. Since the regenerated portion has a small flowing resistance, almost all of the exhaust gases flow into this regenerated portion so that the volume of exhaust gases flowing into the other unregenerated portion of the filter member becomes small.

Electric current is supplied from the battery 8 to the heating resistors 61b to 61f having a small electric power density in order through the contact points of the relay 7. Since the volume of exhaust gases passing through these heating resistors 61b to 61f is small, heat generated by the heating resistors 61b to 61f is effectively applied to the collected carbon particulates without being taken away by the flowing exhaust gases. As a result, the collected carbon particulates can be surely ignited.

The combustion flame spreads to the downstream end of the filter member 5 so that the collected carbon particulates can be burnt off. Consequently, the entire filter member is regenerated.

As described above, according to the first embodiment, a plurality of heating resistors are provided on the upsteam end surface of the filter member. One of the heating resistors has the maximum electric power density to be applied to the end surface of the filter member. At first, the filter portion positioned on the downstream side of the above heating resistor is regenerated.

Thereafter, the other filter portions positioned on the downstream side of the other heating resistors having smaller electric power density, are regenerated easily.

Therefore, a large amount of electric power is unnecessary for regenerating the filter member.

In addition, a diverter valve, a by-pass valve, a by-pass pipe and the like are not required so that the structure of the carbon particulates cleaning device becomes very simple.

Figure 3:
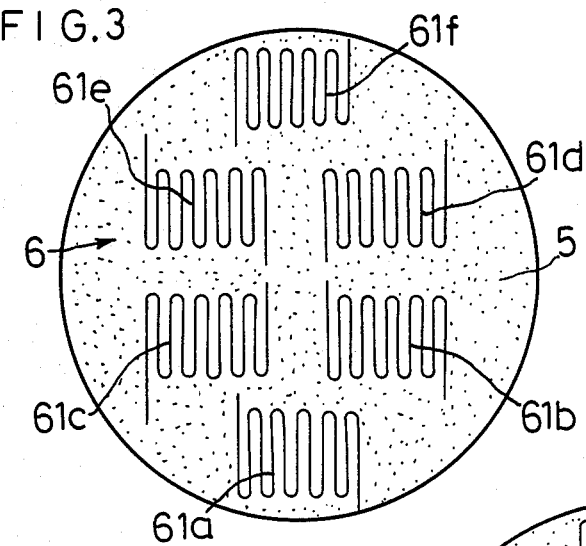

FIG. 3 illustrates a second embodiment of the carbon particulates cleaning device according to the present invention.

In this embodiment, six heating resistors 61a to 61f are made so as to have the same wire diameter and the same shape as one another. However, only the heating resistor 61a is made of platinum having a small resistivity while the other heating resistors 61b to 61f are made of nichrome wire.

Since the heating resistor 61a has a small resistivity it generates large electric power so that the electric power density to be applied to the filter member 5 is large.

Therefore, by supplying electric current to the heating resistors 61a to 61f in order, the same operation effect as that of the first embodiment can be obtained.

Figure 4:
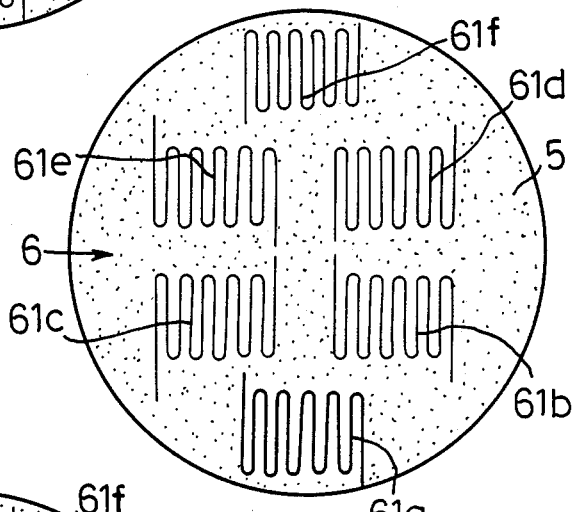

FIG. 4 illustrates a third embodiment of the carbon particulates cleaning device according to the present invention.

In the third embodiment, six heating resistors 61a to 61f are made of nichrome wire so as to have the same shape as one another. The diameter of the nichrome wire of only the heating resistor 61a is made larger than that of nichrome wires of the other heating resistors 61b to 61f.

Therefore, the resistivity of the heating resistor 61a is small so that the heating resistor 61a generates a large amount of electric power and the electric power density to be applied to the filter member is large.

According to the third embodiment, by supplying electric current to the heating resistors 61a to 61f in order, the same operation effect as that of the first embodiment can be obtained.

Figure 5:
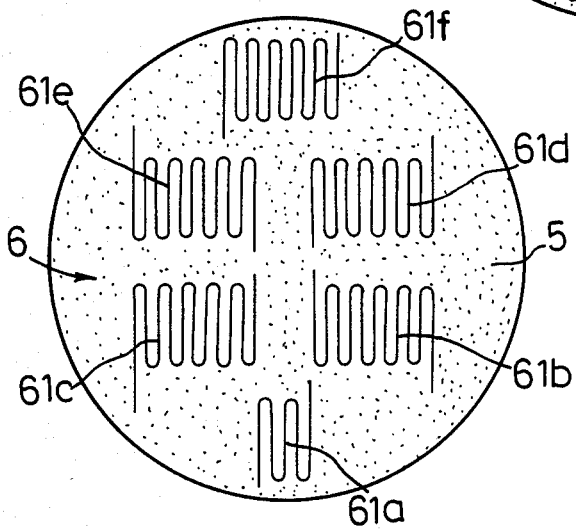

FIG. 5 illustrates a fourth embodiment of the carbon particulates cleaning device according to the present invention.

In the fourth embodiment, six heating resistors 61a to 61f are made of nichrome wire having the same wire diameter as one another. The length of the nichrome wire of only the heating resistor 61a is small so that resistivity of the heating resistor 61 is small. Therefore, the electric power density to be applied to the filter member 5 of the heating resistor 61a is made large.

According to the fourth embodiment, by supplying electric current to the heating resistors 61a to 61f in order, the same operation effect as that of the first embodiment can be obtained.

Figure 6:
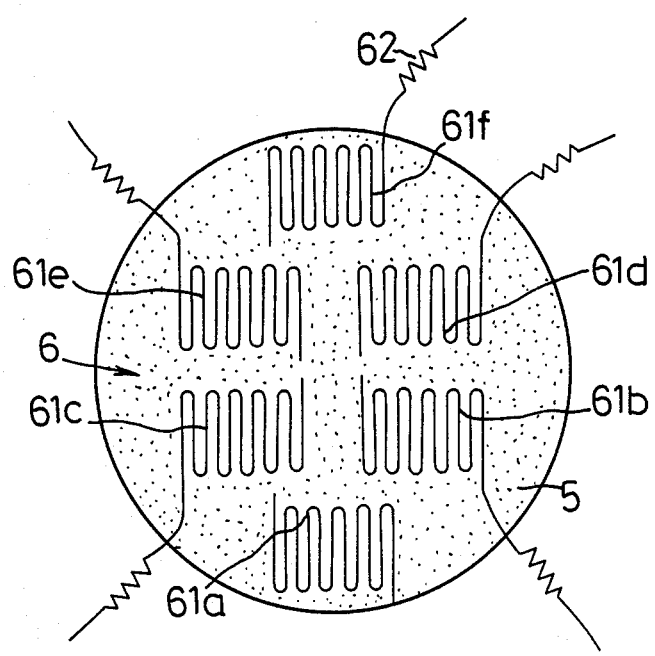

FIG. 6 illustrates a fifth embodiment of the carbon particulates cleaning device according to the present invention.

In the fifth embodiment, six heating resistors 61a to 61f are made of nichrome wire having the same wire diameter as one another so as to have the same wave shape as one another. A resistor 62 is connected to each of the heating resistors 61b to 61f in series so as to decrease the voltage to be applied to the heating resistors 61b to 61f.

Since to the heating resistor 61a, no resistor is connected, the electric power density of the heating resistor 61a becomes larger than that of the other heating resistors.

Therefore, by supplying electric current to the heating resistors 61a to 61f in order, the same operation effect as that of the first embodiment can be obtained.

Figure 7:
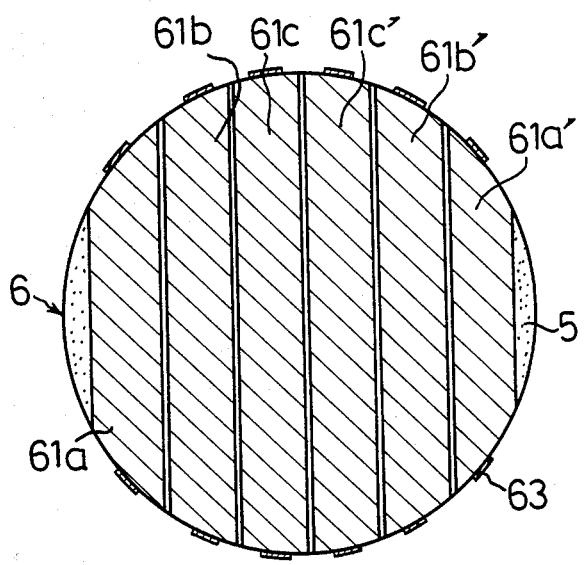

FIG. 7 illustrates a sixth embodiment of the carbon particulates cleaning device according to the present invention.

In the sixth embodiment, on the circular upstream end surface of the filter member 5, film-shaped heating resistors 61a, 61b, 61c, 61a', 61b', 61c' having the same width as one another, are formed in parallel so as to be spaced from one another by predetermined distances. The film-shaped heating resistors are formed by applying a slurry composed of a mixture of titanium carbide with an organic binder to the upstream end surface of the filter member.

In this case, alumina can be added to the above mixture to adjust the resistivity of the obtained heating resistors.

Electric terminals 63 are provided on both end portions of each of the heating resistors 61a to 61c, 61a' to 61c'.

Since the heating resistors 61a, 61a' positioned along the periphery of the filter member 5 are short so that the resistivity thereof is small. Therefore, the heating resistors 61a, 61a' generate a large amount of electric power so that the electric power density to be applied to the filter member 5 is large.

By applying electric current to the heating resistors in the order of from the heating resistors 61a, 61a' having large electric power density to the heating resistors 61b, 61b' and 61c, 61c', the same operation effect as that of the first embodiment can be obtained.

As described above, according to the present invention, electric current is firstly supplied to the heating resistor having the maximum electric power density to regenerate the filter portion positioned on the downstream side of this heating resistor. As a result, most part of exhaust gases flow into the regenerated filter portion while the volume of exhaust gases flowing into the other unregenerated filter portion becomes small.

Therefore, the other unregenerated filter portion can be sufficiently regenerated by means of heating resistors having small electric power density.

Consequently, the entire filter member can be completely regenerated by consuming only a small amount of electric power.

In addition, the carbon particulates cleaning device of the present invention does not require a diverter valve, a by-pass valve, a by-pass pipe and the like. Therefore, the structure of the device can be made simple.

What is claimed is:

1. An exhaust gas cleaning device for collecting carbon particulates in exhaust gases discharged from an engine and burning off the collected carbon particulates, comprising:

a casing having an inlet port and a discharge port for introducing and discharging said exhaust gases;

a filter member for collecting carbon particulates in said exhaust gases which is disposed within said casing between said inlet port and said discharge port; said filter member being made of heat resistant material and being provided with a large number of open passages through which said exhaust gases flow;

an electric heater means for heating and igniting the carbon particulates collected by said filter member; said electric heater means being composed of at least two kinds of heating resistors which are constructed so as to provide different electric power densities to be applied to said filter member, said at least two kinds of heating resistors being adhered to the upstream end surface of said filter member so as to be distributed thereon uniformly;

an electric current supplying means connected to said heater means for supplying electric current from an electric power source to said at least two kinds of heating resistors in succession in the order of from one providing the maximum electric power density to one providing the minimum electric power density at predetermined time intervals; and means connected to said electric current supplying means for detecting when the amount of the carbon particulates collected by said filter member reaches a predetermined level and for initiating operation of said electric current supplying means.

2. An exhaust gas cleaning device according to claim 1, wherein:

said filter member is made of porous ceramic or metal fiber.

3. An exhaust gas cleaning device according to claim 1, wherein:

each of said heating resistors is made of a material selected from the group consisting of nichrome alloy, platinum, molybdenum-manganese alloy, tungsten, gold, silver-paradium alloy, titanium nitride, titanium carbide, silicon carbide and molybdenum silicate.

4. An exhaust gas cleaning device according to claim 3, wherein:

each of said heating resistors has the form of a wave-shaped wire which is adhered to said upstream end surface of said filter member.

5. An exhaust gas cleaning device according to claim 4, wherein:

said wave-shaped heating resistors are made of the same material as one another and have the same wire length and wire diameter as one another; and the distance between adjacent waves of at least one of said wave-shaped heating resistors is smaller than that of the other heating resistors.

6. An exhaust gas cleaning device according to claim 4, wherein:

said wave-shaped heating resistors are made of the same material as one another and have the same shape and wire length as one another; and the wire diameter of at least one of said wave-shaped heating resistors is larger than that of the other heating resistors.

7. An exhaust gas cleaning device according to claim 4, wherein:

said wave-shaped heating resistors have the same shape, wire length, and wire diameter as one another; and at least one of said heating resistors is made of the material having a resistivity smaller than that of the other heating resistors.

8. An exhaust gas cleaning device according to claim 4, wherein:

said wave-shaped heating resistors are made of the same material as one another and have the same wire diameter as one another; and the wire length of at least one of said heating resistors is smaller than that of the other heating resistors.

9. An exhaust gas cleaning device according to claim 4, wherein:

said wave-shaped heating resistors are made of the same material as one another and have the same shape, wire length, wire diameter as one another; and a resistor is connected to each of said heating resistors except for at least one heating resistor in series.

10. An exhaust gas cleaning device according to claim 3, wherein:

each of said heating resistors had the form of a film which is formed on said upstream end surface of said filter member so as to be separated from one another.

11. An exhaust gas cleaning device according to claim 5, wherein:

said film-shaped heating resistors are made of the same material as one another and have the same thickness as one another;

the surface area of at least one of said film-shaped heating resistors is smaller than that of the other film-shaped heating resistors.

* * * * *